(Model.)

T. R. HARRISON.
VALVE.

No. 254,130.  Patented Feb. 28, 1882.

WITNESSES  
INVENTOR  
By his Attorney

UNITED STATES PATENT OFFICE.

THOMAS R. HARRISON, OF PHILADELPHIA, PENNSYLVANIA.

VALVE.

SPECIFICATION forming part of Letters Patent No. 254,130, dated February 28, 1882.

Application filed May 16, 1881. (Model.)

*To all whom it may concern:*

Be it known that I, THOMAS R. HARRISON, of the city and county of Philadelphia, and State of Pennsylvania, have invented a new and useful Valve for Confining and Drawing Compressed Gas and Fluids Under Pressure; and I do hereby declare the following to be a sufficiently full, clear, and exact description thereof to enable others skilled in the art to make and use the said invention.

My invention has for its object the avoidance of the increase of the size of valve-opening by repeated use, as occurs in valves in which a conical plug closes in an opening or valve-seat.

The nature of my invention consists in a concave plunger or cup of hard metal fitting over and pressed against a raised seat or tube of softer metal, through which the gas flows when the valve is open.

Figure 1:
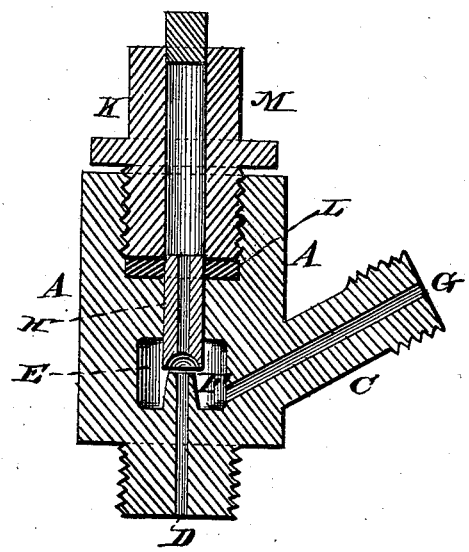
Figure 2:
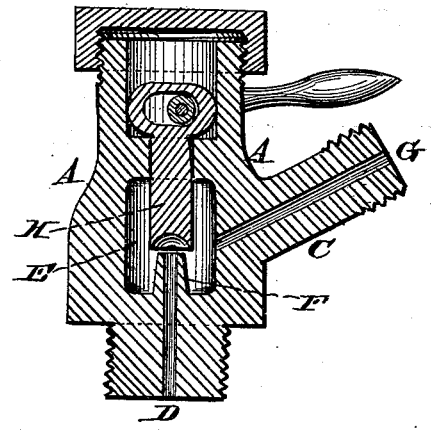

Referring to the drawings, Figure 1 is a central or longitudinal section of a valve containing my improvement, and Fig. 2 a modification.

A is a body having the end screwed for insertion into the gas tank or pipe. C is a branch for discharging, and also screwed for the purpose of attaching it to tubes or other receptacles. The inlet-passage D of the valve terminates in a chamber or cavity, E, where it is surrounded by a short tubulure or projection, F. The outlet-passage G of the valve extends centrally through the branch C from the side of the chamber E. The tubulure F may be formed of the same piece of material as the body A, or may be made of a separate piece of material. In the chamber E is a plunger, H, having a concavity or conical depression in its end, which fits over the tubulures F.
The plunger H is guided in a right line with the passage D and tubulure F, and is operated by a screw or eccentric or other form of cam, as is indicated in Fig. 2. A stuffing-box, K, with a packing, L, and gland M, serves to prevent leakage around the plunger when the valve is opened.

The operation of the valve is as follows: By closing down the plunger H upon the tubulure F compresses the tubulure and closes the aperture and diminishes the area exposed to pressure, instead of increasing the size, as in valves having a conical plug entering a seat.

I am aware that steam-valves have been made in which a cup or cap was suspended so as to freely rotate upon the end of a closing-screw, so as to cover and close a raised valve-seat. Such valves are open to the objection of not bringing the same parts of the valve and seat in contact at each closure thereof. Also, that valves have been made with a seat formed of a separate piece of metal, into which a conical rotating plug was forced by a closing-screw, neither of which valves is guided to prohibit rotative motion to and from its seat; but both present new parts of surfaces for contact at each closing movement, and must be forced shut with such force as to cause the valve to impinge on the seat far enough to close any imperfections of form of seat from previous closings, and are difficult to adjust in graduating or regulating the flow of gas passing through them. Both of these forms are hereby disclaimed; but

What I claim as my invention is—

In a valve for retaining and regulating the flow of gas under high pressure, the combination of a raised valve-seat of soft metal with a cupped or conical concave valve of harder metal, provided with a guide to prevent rotation and insure the closing thereof at all times in the same position, substantially as and for the purpose set forth.

THOMAS R. HARRISON.

Witnesses:
ALEX. H. SIEGEL,
J. DANIEL EBY.